Feb. 19, 1957 D. S. LONG 2,782,053
SPLASH GUARD FLAP FOR AUTOMOTIVE VEHICLES
Filed April 4, 1955
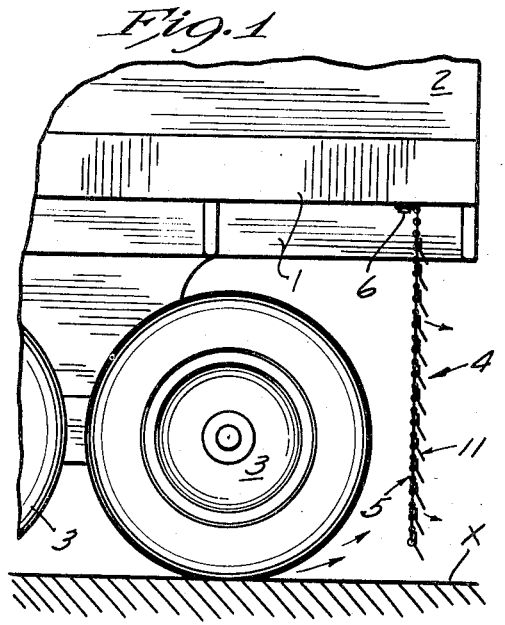
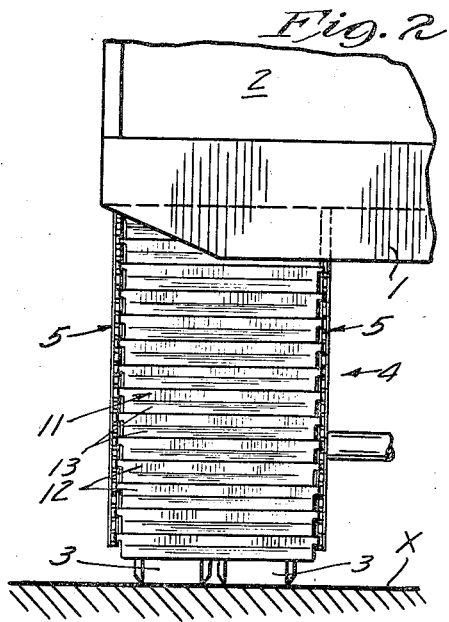
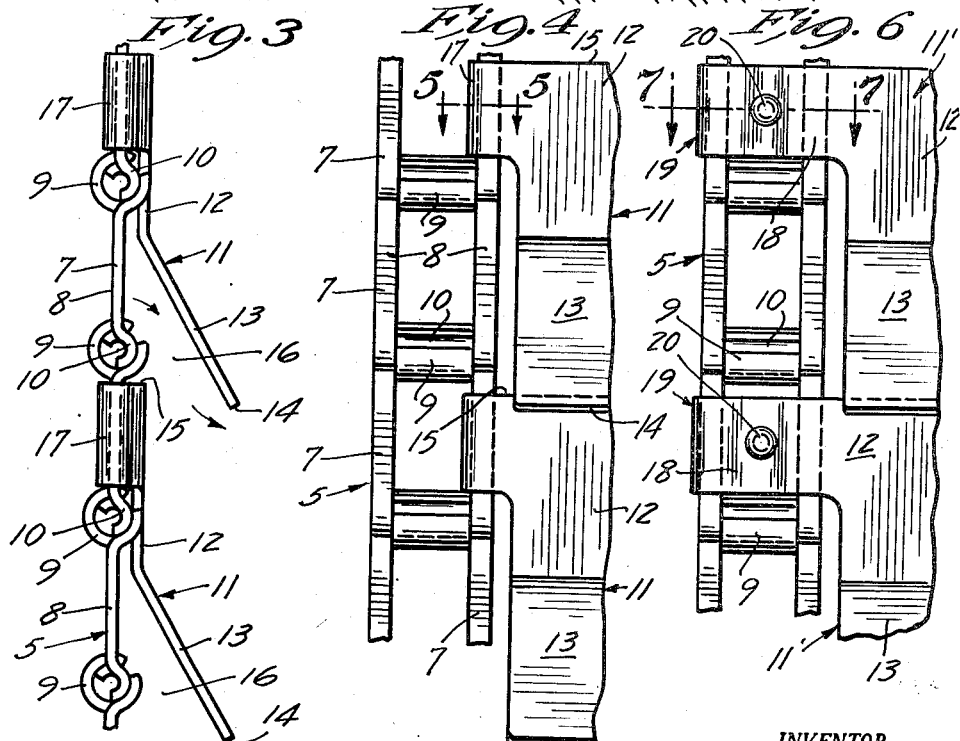
INVENTOR.
Daniel S. Long
BY
Merchant & Merchant
ATTORNEYS

United States Patent Office
2,782,053
Patented Feb. 19, 1957

2,782,053
SPLASH GUARD FLAP FOR AUTOMOTIVE VEHICLES

Daniel S. Long, Owatonna, Minn.

Application April 4, 1955, Serial No. 498,867

2 Claims. (Cl. 280—154.5)

My invention relates generally to appliances for automotive vehicles, and, more specifically, to guards such as flaps adapted to be mounted to a vehicle behind the rear wheels thereof for preventing water, stones, and the like from being thrown rearwardly of the vehicle by the rear wheels.

It is recognized that truck flaps or splash guards of the above or similar types are available, usually being made from heavy fabric or rubber sheeting. In order to be effective to prevent a following vehicle from being struck by stones or water thrown rearwardly and upwardly by the tires, these flaps must necessarily be imperforate. During high speed travel of the vehicle, the imperforate fabric or rubber type of flap must be heavily weighted to prevent the lower free end thereof from being raised by the air stream, and the effectiveness of the flap thus lessened to a marked degree.

An important object of my invention is the provision of a flap or guard which permits free movement of air therethrough so that it depends substantially straight downwardly behind the vehicle wheel, but which deflects stones, water, or other objects in a downward direction so as to protect a following vehicle from being struck thereby.

Another object of my invention is the provision of a flap of the above type which is self-restrained against lateral movements such as might be caused by strong crosswinds or by centrifugal force when the vehicle travels around a curve at high speeds.

Still another object of my invention is the provision of a flap which is flexible in the direction of movement of the vehicle, whereby the same will partially collapse if the vehicle wheel drops into a chuck hole or rut sufficiently deep to cause the lower end of the flap to engage the road surface, and immediately straighten out when the wheel leaves said chuck hole or rut and resumes travel on a substantially smooth surface.

Another object of my invention is the provision of a flap of the type set forth which can be quickly and easily lengthened or shortened, so as to be adapted for use with vehicles of different sizes and flap length requirements.

Another object of my invention is the provision of a flap comprising a plurality of flap sections, any one or more of which can be independently removed and replaced in the event of injury thereto, and with a minimum of time and effort involved.

The above and still further highly important objects and advantages of my invention will become apparent from the following detailed specification, appended claims, and attached drawings.

Referring to the drawings, which illustrate the invention, and in which like characters indicate like parts throughout the several views:

Fig. 1 is a fragmentary view in side elevation of the rear end portion of a truck showing my novel flap mounted thereon;

Fig. 2 is a fragmentary view in rear elevation of the structure of Fig. 1;

Fig. 3 is an enlarged fragmentary view in side elevation of my novel flap;

Fig. 4 is a fragmentary view in rear elevation of my novel flap;

Fig. 5 is a fragmentary section taken substantially on the line 5—5 of Fig. 4;

Fig. 6 is a view corresponding to Fig. 4 but showing a modified form of my invention; and Fig. 7 is a fragmentary section taken substantially on the line 7—7 of Fig. 6.

Referring with greater detail to the drawings, and more particularly to the preferred embodiment of my invention illustrated in Figs. 1–5, a truck frame is indicated at 1 and is shown as having a body 2 mounted thereon. The frame 1 is supported by pneumatic tire equipped wheels 3 which support the vehicle from the road or pavement, indicated at X.

It is well known that the tires of vehicles travelling at relatively high speeds cause objects on the road, such as stones or other foreign matter, to be thrown thereby in a rearward and upward direction, sometimes causing the same to strike a following vehicle with resultant injury or damage thereto. During wet weather, water, generally in a muddy condition, is picked up from the road by the vehicle tires and thrown rearwardly and upwardly, where some thereof lodges on the rear wall surface of the vehicle due to the suction created thereby at relatively high speed travel. A relatively large amount of the muddy water thrown rearwardly and upwardly by the tires strikes the windshield of a following vehicle, whereby to obscure vision therethrough thus creating a serious driving hazard for the driver in said following vehicle. For the above reasons, many localities have passed laws which necessitate the installation of guards or flaps of the type herein disclosed as a safety measure.

My improved flap or guard, indicated in its entirety by the numeral 4, comprises a pair of elongated depending members in the nature of link chains 5 that are anchored at their upper ends to the vehicle frame 1 by suitable means such as bolts or the like 6, one of which is shown, see Fig. 1. The chains 5 are disposed in spaced parallel relationship transversely of the direction of movement of the vehicle and in closely spaced relation to the rear wheels 3 and rearwardly thereof. The chains 5 are each composed of a plurality of links 7, each of said links comprising a pair of vertically extending elements 8 and upper and lower horizontally disposed pivot elements 9 and 10, respectively. With reference to Fig. 3, it will be noted that the lower pivot element 10 of each link 7 is contained within the upper pivot element 9 of an underlying link, the axes of pivotal movement between the links 7 extending in a horizontal direction transversely of the direction of movement of the vehicle. The pivot elements 10 permit free swinging movements between adjacent links 7 but prevent relative lateral movement there-between in a direction transversely of the vehicle. The chains 5 are of a type commonly used for various purposes and further detailed description thereof is deemed unnecessary.

My novel flap further includes a plurality of louvers 11 preferably made from sheet metal, which louvers extend horizontally between the chains 5 in spaced parallel relation to each other. The louvers 11 each comprise longitudinally extending upper and lower portions 12 and 13 respectively, the upper portions 12 being disposed in a vertical plane, and the lower portions 13 extending rearwardly and downwardly at an oblique angle to the plane of the upper portions 12. It will be noted with reference to Figs. 1 and 3 that the upper portions 12 of the louvers 11 are disposed in a common vertical plane, and that the lower edge 14 of each louver is downwardly spaced from the horizontal plane of the top edge 15 of the adjacent underlying louver. The lower portion 13 of each louver is upwardly and rearwardly spaced from the upper portion 12 of the adjacent underlying louver whereby to define an open passage 16 therebetween. The passages 16 are sufficiently large to permit a free flow of air therethrough, so that the flap 4 will remain in a substantially vertical position in close proximity to the rear portion of the tire even when the vehicle is being driven at relatively high speeds, and without the necessity for utilizing weights or other means to maintain the flap in this position. Stones, nails, or other foreign material which are thrown rearwardly by the road engaging portion of the tires on the wheels 3 strike the front surfaces of the louvers 11, and are either deflected through the passages 16 to the ground, or fall to the ground in front of the flap. In like manner, when the roadway is wet due to rain or snow, spray thrown upwardly and rearwardly by the tires is deflected by the louvers so as to drip downwardly from the lower edges 14 thereof, or is carried downwardly through the passages 16 by the air stream flowing therethrough.

The louvers 11 are anchored at their opposite ends to the chains 5 by means of tubular portions 17 integrally formed with the upper portions 12 of the louvers 11. Preferably and as shown, the tubular portions 17 each receive a different one of the adjacent vertically extended element 8 of the links 7. As shown in Figs. 3 and 4, the louvers are disposed so that the tubular portions thereof embrace adjacent vertically extended portions 8 of alternate links 7, whereby to provide the proper spacing between the louvers 11 for a chain of a given size. The louvers being made from sheet metal, the tubular portions 17 thereof may be easily opened sufficiently to permit removal thereof from their respective chains when such removal and replacement is necessary. The links 7 of the chains 5 are of a type which may be readily detached from each other, so that the flap may be lengthened or shortened in a quick and easy manner. Furthermore, when one of the wheels 3 moves downwardly into a rut or chuck hole, the pivotal connections between the links 7 of the chains 5 permits the flap 4 to partially collapse as the lower end thereof engages the ground without damage to the flap. Then, when the wheels 3 leave the chuck hole or rut and enter a relatively smooth road surface, the flap automatically straightens out to the operative position of Figs. 1 and 2.

In the modified form of the invention illustrated in Figs. 6 and 7, I provide a flap having supporting chains identical to the chains 5, the parts thereof bearing the same reference characters. In this form of the invention, I provide louvers 11' which, except for the mounting means thereof are identical to the louvers 11 and have like upper portions 12 and lower portions 13. At their opposite ends the louvers 11' are provided with anchoring strips 18 that are bent to cross-sectionally U-shape whereby to provide longitudinally extending hooks 19, see Fig. 7. The hooks 19 are adapted to receive both of the vertically extended portions 8 of a given chain link 7, and a rivet or like fastening means 20 is passed through aligned apertures 21 in the opposite sides of the hook 19 and between the vertically extended portions 8 of the engaged chain link 7. This means of fastening the louvers 11' to the chains 5 is more rigid than that of the structure illustrated in Figs. 1-5, but requires removal of the rivets 20 before a louver 11' may be replaced.

From the above it will be seen that I have provided a wheel guard or flap which is completely satisfactory for the accomplishment of the objectives set forth; and while I have shown and described a preferred embodiment and one modification of my novel structure, it will be understood that the same is capable of further modification without departure from the spirit and scope of the invention as defined in the claims.

What I claim is:

1. In a truck flap of the kind described, a pair of elongated depending link chains, means for mounting said chains at their upper ends to a vehicle closely behind a supporting wheel thereof and in spaced parallel relationship transversely of the direction of movement of said vehicle, a plurality of louvers extending horizontally between said chains, and means on the opposite ends of each of said louvers for anchoring said louvers each to different selected links on said chains, said louvers having longitudinally extending upper and lower portions in oblique angular relation to each other, the lower edge of each louver being disposed below the horizontal plane of the top edge of the adjacent underlying louver and rearwardly spaced from the top portion thereof, whereby to provide an open passage therebetween, each link of said chains comprising a pair of vertically extending elements spaced apart in a direction longitudinally of said louvers and connected at their opposite ends by horizontally disposed pivot elements whereby said links are connected together for pivotal movements with respect to each other about horizontal axes extending transversely of the direction of movement of the vehicle, said pivotal connections restraining said links against relative movement in the direction of said axes, said means for anchoring said louvers to the links comprising a tubular portion on the opposite end of each louver, each of said tubular portions encompassing the adjacent vertically extending element of a different one of said links.

2. In a truck flap of the kind described, a pair of elongated depending link chains, means for mounting said chains at their upper ends to a vehicle closely behind a supporting wheel thereof and in spaced parallel relationship transversely of the direction of movement of said vehicle, a plurality of louvers extending horizontally between said chains, and means on the opposite ends of each of said louvers for anchoring said louvers each to different selected links on said chains, said louvers having longitudinally extending upper and lower portions in oblique angular relation to each other, the lower edge of each louver being disposed below the horizontal plane of the top edge of the adjacent underlying louver and rearwardly spaced from the top portion thereof, whereby to provide an open passage therebetween, each link of said chains comprising a pair of vertically extending elements spaced apart in a direction longitudinally of said louvers and connected at their opposite ends by horizontally disposed pivot elements whereby said links are connected together for pivotal movements with respect to each other about horizontal axes extending transversely of the direction of movement of the vehicle, said pivotal connections restraining said links against relative movement in the direction of said axes, said anchoring means comprising anchoring strips extending longitudinally outwardly from opposite ends of each of said louvers, said anchoring strips being of cross-sectionally U-shape whereby to provide horizontally disposed longitudinally inwardly opening hooks, said hooks each receiving the spaced vertical elements of adjacent ones of said links, and means locking said links against movement outwardly of said hooks.

References Cited in the file of this patent

UNITED STATES PATENTS

| 1,984,807 | Platte | Dec. 18, 1934 |
| 2,405,262 | Lindsay | Aug. 6, 1946 |
| 2,572,774 | Smith | Oct. 23, 1951 |
| 2,699,955 | Eaves | Jan. 18, 1955 |